(12) United States Patent
Srinivasaraghavan et al.

(10) Patent No.: US 12,299,662 B2
(45) Date of Patent: May 13, 2025

(54) DECENTRALIZED TRANSACTION PROCESSING

(71) Applicant: PayPal, Inc., San Jose, CA (US)

(72) Inventors: Balaji Srinivasaraghavan, Chennai (IN); Poorna Vaidyanathan, Chennai (IN); Tamilarasan Sundaresan, Chennai (IN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/584,949

(22) Filed: Jan. 26, 2022

(65) Prior Publication Data

US 2023/0169483 A1 Jun. 1, 2023

(30) Foreign Application Priority Data

Nov. 26, 2021 (IN) .............................. 202141054847

(51) Int. Cl.
  *G06Q 20/22* (2012.01)
  *G06Q 20/02* (2012.01)
  *G06Q 20/06* (2012.01)

(52) U.S. Cl.
  CPC ......... *G06Q 20/223* (2013.01); *G06Q 20/023* (2013.01); *G06Q 20/065* (2013.01)

(58) Field of Classification Search
  CPC ... G06Q 20/223; G06Q 20/023; G06Q 20/065

(Continued)

(56) References Cited

U.S. PATENT DOCUMENTS 9,742,781 B1 * 8/2017 Saylor ................. H04L 63/0861
11,228,510 B2 * 1/2022 Kruse ...................... G06F 3/067
(Continued)

FOREIGN PATENT DOCUMENTS

EP          2661134 A1 * 11/2013 ............ H04W 48/06
JP          09259091 A * 10/1997
(Continued)

OTHER PUBLICATIONS

Taft et al. E-Store: Fine-Grained Elastic Partitioning for Distributed Transaction Processing System. Proceedings of the VLDB Endowment. Nov. 1, 2014. vol. 8, No. 3, pp. 245-256. (Year: 2014).*

(Continued)

*Primary Examiner* — Virpi H Kanervo
(74) *Attorney, Agent, or Firm* — Greenberg Traurig, LLP

(57) ABSTRACT

A system can comprise a processor, and a memory that stores executable instructions that, when executed by the processor, facilitate performance of operations, comprising receiving transaction data representative of a group of transaction settlement requests, based on the group of transaction settlement requests, determining subgroups of transaction settlement requests, determining, for each transaction settlement request of the group of transaction settlement requests and based on a priority identifier of each respective transaction settlement request, respective priorities and distributed processing allocation data representative of an allocation of threads of distributed processing nodes of a group of distributed processing nodes, and based on the respective priorities and allocation data, processing, using the group of distributed processing nodes, at least some transaction settlement requests of the group of transaction settlement requests.

20 Claims, 9 Drawing Sheets

(58) Field of Classification Search
USPC .......................................................... 705/44
See application file for complete search history.

(56) References Cited

U.S. PATENT DOCUMENTS

2019/0019186 A1\* 1/2019 Falah ................ G06Q 20/4037
2020/0167769 A1\* 5/2020 Green ................ G06Q 20/3825

FOREIGN PATENT DOCUMENTS

| JP | 2014026362 A | \* | 2/2014 | |
| --- | --- | --- | --- | --- |
| KR | 2016/0038520 A | \* | 9/2014 | ............. G06Q 20/34 |
| KR | 2016003852 A | \* | 1/2016 | ......... C08G 18/0819 |
| WO | WO-2019218055 A1 | \* | 11/2019 | ............. G06F 21/74 |

OTHER PUBLICATIONS

E. Kokoris-Kogias, P. Jovanovic, L. Gasser, N. Gailly, E. Syta and B. Ford, "OmniLedger: A Secure, Scale-Out, Decentralized Ledger via Sharding," 2018 IEEE Symposium on Security and Privacy (SP), San Francisco, CA, USA, 2018, pp. 583-598. (Year: 2018).\*
Mills et al., Distributed Ledger Technology in Payments, Clearing, and Settlement. (Year: 2016).\*
W.-T. Tsai, R. Blower, Y. Zhu and L. Yu, "A System View of Financial Blockchains," 2016 IEEE Symposium on Service-Oriented System Engineering (SOSE), Oxford, UK, 2016, pp. 450-457. (Year: 2016).\*
Mills, David C., et al. "Distributed ledger technology in payments, clearing, and settlement." (Year: 2016).\*
Rücker, B. | "Architecture options to run a workflow engine." Personal blog berndruecker, published Dec. 19, 2017, 16 pages.

\* cited by examiner

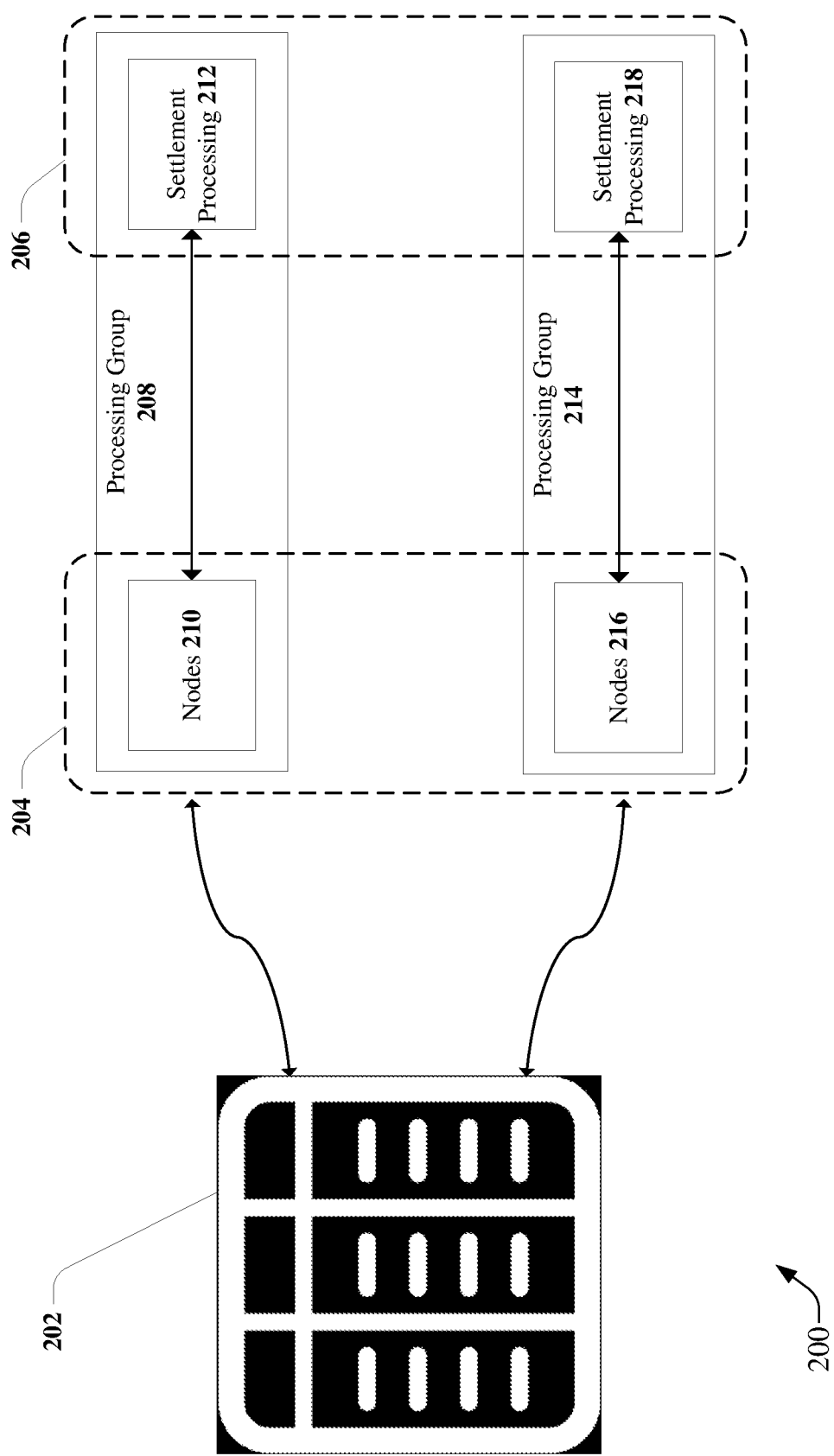

Table 300:

| Task ID | MOD Value | Locked Until | Locked By | Flow ID | Current State |
|---|---|---|---|---|---|
| 444540 | 28 | | UUID | 23 | |
| 225221 | 5 | | UUID | 76 | |
| 540386 | 2 | | UUID | 16 | |
| 837829 | 5 | | UUID | 2 | |
| 195231 | 31 | | UUID | 75 | |
| 968306 | 18 | | UUID | 71 | |
| 323516 | 28 | | UUID | 90 | |
| 967218 | 18 | | UUID | 56 | |
| 462812 | 28 | | UUID | 45 | |
| 778995 | 19 | | UUID | 90 | |
| 333382 | 6 | | UUID | 43 | |
| 671114 | 10 | | UUID | 75 | |
| 824577 | 1 | | UUID | 58 | |
| 568440 | 24 | | UUID | 81 | |
| 442335 | 31 | | UUID | 81 | |
| 556902 | 6 | | UUID | 29 | |
| 556417 | 1 | | UUID | 25 | |
| 670245 | 5 | | UUID | 52 | |
| 358588 | 28 | | UUID | 52 | |
| 985601 | 1 | | UUID | 33 | |
| 976621 | 13 | | UUID | 43 | |
| 941361 | 17 | | UUID | 21 | |
| 990834 | 18 | | UUID | 72 | |
| 984018 | 18 | | UUID | 45 | |
| 422352 | 16 | | UUID | 78 | |
| 598709 | 21 | | UUID | 61 | |
| 995674 | 26 | | UUID | 24 | |
| 140164 | 4 | | UUID | 18 | |
| 823229 | 29 | | UUID | 6 | |
| 708673 | 1 | | UUID | 76 | |
| 393671 | 7 | | UUID | 18 | |

Table 302:

| Task ID | MOD Value | Locked Until | Locked By | Flow ID | Current State |
|---|---|---|---|---|---|
| 824577 | 1 | | UUID | 58 | |
| 556417 | 1 | | UUID | 25 | |
| 985601 | 1 | | UUID | 33 | |
| 708673 | 1 | | UUID | 76 | |
| 540386 | 2 | | UUID | 16 | |
| 140164 | 4 | | UUID | 18 | |
| 225221 | 5 | | UUID | 76 | |
| 837829 | 5 | | UUID | 2 | |
| 670245 | 5 | | UUID | 52 | |
| 333382 | 6 | | UUID | 43 | |
| 556902 | 6 | | UUID | 29 | |
| 393671 | 7 | | UUID | 18 | |
| 671114 | 10 | | UUID | 75 | |
| 976621 | 13 | | UUID | 43 | |
| 422352 | 16 | | UUID | 78 | |
| 941361 | 17 | | UUID | 21 | |
| 968306 | 18 | | UUID | 71 | |
| 967218 | 18 | | UUID | 56 | |
| 990834 | 18 | | UUID | 72 | |
| 984018 | 18 | | UUID | 45 | |
| 778995 | 19 | | UUID | 90 | |
| 598709 | 21 | | UUID | 61 | |
| 568440 | 24 | | UUID | 81 | |
| 995674 | 26 | | UUID | 24 | |
| 444540 | 28 | | UUID | 23 | |
| 323516 | 28 | | UUID | 90 | |
| 462812 | 28 | | UUID | 45 | |
| 358588 | 28 | | UUID | 52 | |
| 823229 | 29 | | UUID | 6 | |
| 195231 | 31 | | UUID | 75 | |
| 442335 | 31 | | UUID | 81 | |

FIG. 3

DECENTRALIZED TRANSACTION PROCESSING

CROSS-REFERENCE TO RELATED APPLICATION

This application claims priority to India Provisional Patent Application No. 202141054847, filed on Nov. 26, 2021, and entitled "DECENTRALIZED TRANSACTION PROCESSING," the entirety of which application is hereby incorporated by reference herein.

TECHNICAL FIELD

The disclosed subject matter generally relates to distributed processing, and more particularly to decentralized transaction processing using distributed processing nodes.

BACKGROUND

Existing settlement processing is typically batched. The batching of settlements often results in the failure to meet certain requirements. This can occur due to a batch of settlements or multiple batches of settlements being processed without sequencing or prioritization of the settlement requests in the batches. As a result, some settlement requests in a batch, such as those with processing time guarantees, are processed inefficiently, often resulting in failures to satisfy a processing time guarantees. By missing a processing time guarantee, users or entities can experience delays in settlement processing and trust in associated settlement processing systems can be eroded. Additionally, processing entities may be required to refund associated processing fees, leading to waste, financial loss, and decreased user adoption. Further, existing processing entities can over-query databases, which can lead to further waste.

BRIEF DESCRIPTION OF DRAWINGS

FIG. 2 is a block diagram of an exemplary system architecture in accordance with one or more embodiments described herein.

FIG. 3 illustrates a chart of an exemplary orchestration table in accordance with one or more embodiments described herein.

DETAILED DESCRIPTION

Figure 1:
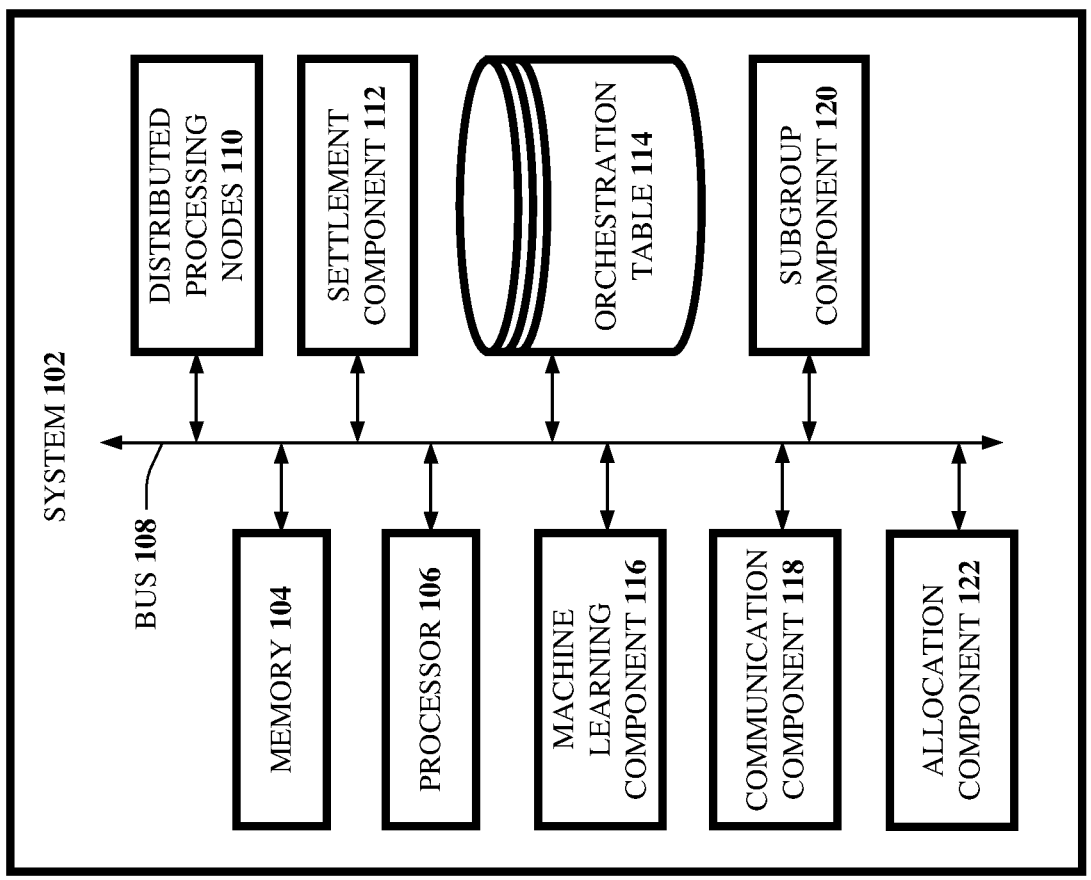
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, settlement processing can be improved in various ways, and various embodiments are described herein to this end and/or other ends.

According to an embodiment, a system can comprise a processor and a non-transitory computer-readable medium having stored thereon computer-executable instructions that are executable by the system to cause the system to perform operations comprising: receiving transaction data representative of a group of transaction settlement requests, based on the group of transaction settlement requests, determining subgroups of transaction settlement requests, determining, for each transaction settlement request of the group of transaction settlement requests and based on a priority identifier of each respective transaction settlement request, respective priorities and distributed processing allocation data representative of an allocation of threads of distributed processing nodes of a group of distributed processing nodes, and based on the respective priorities and allocation data, processing, using the group of distributed processing nodes, at least some transaction settlement requests of the group of transaction settlement requests.

In one or more embodiments, determining the subgroups of the transaction settlement requests can comprise determining the subgroups of the transaction settlement requests using a modulo operation applied to unique identifiers for each transaction settlement request of the group of transaction settlement requests. The modulo operation can be used, for example, to generate virtual sub-tables/subgroups of the group of transaction settlement requests to facilitate more efficient distributed processing, as later discussed in greater detail.

In various embodiments, the above operations can further comprise: randomly allocating a thread of a distributed processing node of the group of distributed processing nodes to a subgroup of transaction settlement requests of the subgroups of transaction settlement requests. In this regard, processing capacity in the form of a collection of threads across a plurality of distributed processing nodes of the group of distributes processing nodes can be allocated to a subgroup of transaction settlement requests in which each thread can execute one or more of a series of processing instructions. Further in this regard, the distributed processing node can process transaction settlement requests comprising a defined priority identifier associated with the distributed processing node. For instance, the defined priority identifier can be representative of a priority of a given transaction settlement request relative to other transaction settlement requests. For example, rapid-type transactions can comprise a higher priority than non-rapid-type transactions which can be afforded more time for transaction settlement processing. It is noted that the distributed processing node can comprise a defined simultaneous transaction settlement request processing threshold, and the distributed processing node can process batches of transaction settlement requests determined based on a defined multiple of the defined simultaneous transaction settlement request processing threshold. In this regard, the defined simultaneous transaction settlement request processing threshold can be based on, for instance, a capability of the distributed processing node (e.g., compute capability, available memory, or set according to a specification).

In some embodiments, the above operations can further comprise: locking, by a distributed processing node of the group of distributed processing nodes, the at least some transaction settlement requests of the group of transaction settlement requests for a defined period of time. The foregoing can enable the distributed processing node to process the at least some transactions settlement requests for the defined period of time without interruption by another distributed processing node. In this regard, the operations can further comprise: in response to the defined period of time being determined to have elapsed, determining remaining settlement requests from the at least some transaction settlement requests. Such remaining settlement requests can comprise settlement requests that were not able to be completed by the distributed processing node within the defined amount of time (e.g., due to a processing failure or an error). In further embodiments, the operations can further comprise: in response to a determination that a remaining settlement request of the remaining settlement requests comprises a pending processing request, increasing the defined period of time by a defined increased amount of time, and in response to the defined increased amount of time being determined to have elapsed, reprocessing, the remaining settlement request via the distributed processing node. The foregoing can afford additional time for the distributed processing node to continue attempting to process the remaining settlement request if, for instance, additional time is determined to be threshold likely to result in successfully processing the remaining settlement request. In additional embodiments, the operations can further comprise: in response to a determination that a remaining settlement request of the remaining settlement requests comprises a failed processing request, terminating the remaining settlement request. In this regard, terminating the remaining settlement request can comprise preventing the remaining settlement request from future processing by a distributed processing node of the group of distributed processing nodes. The foregoing can prevent additional time from being wasted on a transaction settlement request that is determined to be threshold unlikely to result in future successful processing.

In one or more embodiments, a respective priority of the respective priorities can be based on a respective defined guaranteed processing time of a type of transaction settlement request. For example, original credit type transactions can be associated with a guaranteed processing time. In this regard, a respective priority of an original credit transaction type transaction can be greater than a respective priority of an automated clearing house type transaction, for instance, to facilitate processing of the higher priority transaction settlement request to be completed within a guaranteed or threshold processing time. According to an example, original credit type transactions can comprise a dedicated compute capacity for threads and/or distributed processing nodes allocated to the original credit type transaction that cannot be utilized or exhausted by concurrent settlement requests of other types of transaction settlements.

It is noted that, in various embodiments, the above operations can further comprise: determining that a transaction settlement request of group of transaction settlement requests is not yet ready for processing, and in response to determining that a transaction settlement request is not yet ready for processing, locking the transaction settlement request for a defined period of time. For example, an entity (e.g., a bank or credit entity) can determine that a transaction settlement request is not yet ready for processing (e.g., additional time needed). In this regard, the transaction settlement request can be locked for a determined or defined amount of time (e.g., until the transaction settlement request is ready for processing).

In another embodiment, a method can comprise: determining, by a device comprising a processor and based on a type of transaction settlement request of each respective settlement request of a group of transaction settlement requests, respective priorities of each transaction settlement request of the group of transaction settlement requests and distributed processing allocation data representative of respective allocations of threads of distributed processing nodes of a group of distributed processing nodes, based on the respective priorities and the respective allocations, retrieving, by the device via a distributed processing node of the group of distributed processing nodes, at least some transaction settlement requests of the group of transaction settlement requests, and for a defined period of time and based on the respective priorities and the respective allocations, processing by the device via the distributed processing node, the at least some transaction settlement requests.

In various embodiments, the above method can further comprise: in response to the defined period of time being determined to have elapsed, determining, by the device, remaining settlement requests from the at least some transaction settlement requests. In additional embodiments, the method can further comprise: replacing, by the device, pending remaining settlement requests of the remaining settlement requests, wherein the pending remaining settlement requests are made available, by the device, for reprocessing by the group of distributed processing nodes. In this regard, the remaining settlement requests that are delaying one or more distributed processing nodes can be replaced with a different transaction settlement request (e.g., one or more settlement requests that is/are ready for processing). In further embodiments, the method can further comprise: terminating, by the device, failed remaining settlement requests of the remaining settlement requests, wherein the failed remaining settlement requests are not made available, by the device, for reprocessing by the group of distributed processing nodes. In this regard, failed transaction settlement request that are determined to be threshold unlikely to result in future successful processing can be locked and prevented from future processing.

In some embodiments, the above method can further comprise: allocating, by the device to a thread of the distributed processing node, a first subgroup of transaction settlement requests of the group of transaction settlement requests, wherein subgroups of the transaction settlement requests are determined, by the device, using a modulo operation applied to unique identifiers for each transaction settlement request of the group of transaction settlement requests. In further embodiments, retrieving the at least some transaction settlement requests can comprise retrieving, by the device via the distributed processing node, settlement requests from among the first subgroup of transaction settlement requests, and the method can further comprise: in response to the distributed processing node not retrieving a threshold quantity of transaction settlement requests from the first subgroup of transaction settlement requests, retrieving, by the device via the distributed processing node, settlement requests from among one or more additional subgroups of transaction settlement requests of the group of transaction settlement requests until the threshold quantity of transaction settlement requests is determined to be satisfied.

In one or more embodiments, the distributed processing node can comprise a first processing node, and the method can further comprise: retrieving, by the device via a second distributed processing node of the group of distributed processing nodes, at least some transaction settlement requests of the group of transaction settlement requests other than those successfully processed by the first processing node. It is noted that the distributed processing nodes can comprise a variety of distributed processing nodes (e.g., tens, hundreds, thousands, etc. of nodes) and embodiments herein are not limited to one or two distributed processing nodes.

In yet another embodiment, a non-transitory machine-readable medium can comprise executable instructions that, when executed by a processor, facilitate performance of operations, comprising: based on a group of transaction settlement requests, determining subgroups of transaction settlement requests using a modulo operation applied to unique identifiers for each transaction settlement request of the group of transaction settlement requests, determining, for each transaction settlement request of the group of transaction settlement requests and based on a priority identifier of each respective transaction settlement request, respective priorities and distributed processing allocation data representative of an allocation of threads of distributed processing nodes of a group of distributed processing nodes, and based on the respective priorities and allocation data, processing, using the group of distributed processing nodes, one or more transaction settlement requests of the group of transaction settlement requests. In various embodiments, the respective priorities of each transaction settlement request can be based in part on a processing fee associated with each transaction settlement request.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool (e.g., any suitable combination of computer-executable hardware and/or computer-executable software) which can be configured to perform various operations relating to decentralized settlement processing. The system 102 can comprise one or more of a variety of components, such as memory 104, processor 106, bus 108, distributed processing nodes 110, settlement component 112, orchestration table 114, machine learning (ML) component 116, communication component 118, subgroup component 120, and/or allocation component 122.

In various embodiments, one or more of the memory 104, processor 106, bus 108, distributed processing nodes 110, settlement component 112, orchestration table 114, ML component 116, communication component 118, subgroup component 120, and/or allocation component 122 can be communicatively or operably coupled (e.g., over a bus or wireless network) to one another to perform one or more functions of the system 102.

According to an embodiment, the communication component 118 can receive transaction data representative of a group of transaction settlement requests. Transaction settlement request herein can be received, for instance, from bank entities, credit entities, consumer/user entities, associated devices/hardware, or other suitable entities or components. Such transaction data can be represented in an orchestration table 114 (see, e.g., FIG. 3 which illustrates a detailed view of a similar orchestration table). In an implementation, the communication component 118 can store the transaction data in the orchestration table 114. In further implementations, the communication component 118 can receive the orchestration table 114 (e.g., and store the orchestration table 114 in a suitable memory or data store).

It is noted that the communication component 118 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

According to an embodiment, the subgroup component 120 can (e.g., based on the group of transaction settlement requests) determine subgroups of transaction settlement requests. It is noted that the subgroup component 120 can determine the subgroups of the transaction settlement requests using a modulo operation applied to unique identifiers for each transaction settlement request of the group of transaction settlement requests. Such a modulo (e.g., MOD) operation can partition the group of transaction settlement requests (e.g., the orchestration table 114) into subgroups (e.g., virtual sub-tables of the orchestration table 114). For example, a MOD operation can be applied to a Task ID herein (e.g., as later discussed in greater detail) to generate a defined quantity (e.g., 32) virtual sub-tables from the orchestration table 114. It is noted that the modulo operation can be used, for example, to generate virtual sub-tables/subgroups of the group of transaction settlement requests (e.g., from the orchestration table 114) to facilitate more efficient distributed processing herein.

According to an embodiment, the allocation component 122 can determine (e.g., for each transaction settlement request of the group of transaction settlement requests and based on a priority identifier of each respective transaction settlement request) respective priorities and distributed processing allocation data representative of an allocation of threads of distributed processing nodes of a group of distributed processing nodes 110. In further embodiments, such allocation can comprise an allocation of threads of distributed processing nodes to a type of transaction settlement request. For example, a rapid-type transaction can be allocated a larger quantity of distributed processing nodes 110 than a non-rapid-type transaction. In various embodiments, a respective priority of the respective priorities can be based on a respective defined guaranteed processing time of a type of transaction settlement request. In some implementations embodiments, a respective priority of an original credit transaction type transaction (e.g., a rapid-type transaction) can be greater than a respective priority of an automated clearing house type transaction (e.g., a non-rapid-type transaction). In further implementations, the respective priorities of each transaction settlement request can be based in part on a processing fee associated with each transaction settlement request. In this regard, a settlement request for which a user or entity paid a fee to process (e.g., for expedited processing) can be determined to be of a higher relative priority and/or can be allocated one or more additional distributed processing nodes of the distributed processing nodes 110. In various embodiments, capacity allocation herein can comprise the quantity of distributed processing nodes or threads of distributed processing nodes associated with a particular Flow ID (see, e.g., FIG. 3 as later discussed in greater detail). In some implementations, capacity allocation herein can be associated with the quantity of concurrent transactions settlements to process for a particular Flow ID. In various implementations, distributed nodes herein can comprise multi-core distributed processing nodes. In this regard, each distributed processing node can perform distributed processing herein via the multiple cores of the distributes processing nodes. For example, each core of a processor of a distributed processing node can utilize five threads (though other suitable quantities can be utilized). In this example, for an eight-core distributed processing node, forty threads can be allocated to distributed processing flows for each node. In another example, a distributed processing flow with a one-hundred thread allocation utilizing a ten distributed processing node cluster can utilize ten threads on each distributed processing node. In this regard, a distributed processing node can process multiple flow types on different threads of the distributed processing nodes.

In various implementations, the distributed processing nodes 110 (e.g., via one or more threads of the distributed processing nodes) can process, based on the respective priorities and allocation data, at least some transaction settlement requests of the group of transaction settlement requests. For example, a distributed processing node can process a maximum respective capacity of transaction settlement requests, representative of the at least some transaction settlement requests of the group of transaction settlement requests.

According to an embodiment, the allocation component 122 can randomly allocate a thread of a distributed processing node of the group of distributed processing nodes 110 to a subgroup of transaction settlement requests of the subgroups of transaction settlement requests. In this regard, the distributed processing node can process transaction settlement requests comprising a defined priority identifier associated with the distributed processing node. It is noted that a given distributed processing node or a given thread of a distributed processing node can be associated with one or more defined priority identifiers (e.g., Flow IDs). For example, a thread and/or a distributed processing node can be associated with a first group of Flow IDs and a second distributed processing node can be associated with a second group of Flow IDs. In this example, each Flow ID of the first group of Flow IDs can be of higher priority than each Flow ID of the second group of Flow IDs. In further embodiments, the thread and/or the distributed processing node can comprise a defined simultaneous transaction settlement request processing threshold. In various implementations, the defined simultaneous transaction settlement request processing threshold can be based on, for instance, a capability of the thread and/or the distributed processing node (e.g., compute capability, available memory, or set according to a specification). In this regard, the thread and/or distributed processing node can process batches of transaction settlement requests determined based on a defined multiple of the defined simultaneous transaction settlement request processing threshold. It is noted that the allocation component 122 can allocate a defined multiple of distributed processing node capacity to a given distributed processing node at a time. For example, if a distributed processing node or thread herein can concurrently process twenty transaction settlements, the allocation component 122 can allocate 100 rows in the orchestration table 114 (e.g., a subgroup of the orchestration table 114) to scan for suitable settlements requests associated with that distributed processing node (in this example, the defined multiple comprises 5x). It is noted that, if the distributed processing node does not fully satisfy its available capacity of transaction settlement request from the allocation of 100 rows, the allocation component 122 can allocate another 100 rows from the orchestration table 144 (e.g., the subgroup of the orchestration table 114). It is further noted that while the thread or distributed processing node is scanning its allocation of 100 rows, other nodes are not able to scan those 100 rows (e.g., using a "skip lock" in the orchestration table 114). It is additionally noted that the use of 100 rows is purely exemplary, and that allocations herein can comprise a variety of suitable allocation quantities. Likewise, capabilities and defined multiples described above are also exemplary, and embodiments herein can comprise different capabilities (e.g., for the distributed processing nodes) and/or different defined multiples herein.

According to an embodiment, a distributed processing node of the distributed processing nodes 110 can lock the at least some transaction settlement requests of the group of transaction settlement requests for a defined period of time. In this regard, in response to the defined period of time being determined to have elapsed (e.g., by the distributed processing node), the distributed processing node can determine remaining settlement requests from the at least some transaction settlement requests. In some embodiments, the distributed processing node (or a different component herein such as the allocation component 122 or settlement component 112) can, in response to a determination (e.g., by the distributed processing node, the allocation component 122, or the settlement component 112) that a remaining settlement request of the remaining settlement requests comprises a pending processing request, increase the defined period of time by a defined increased amount of time. In some embodiments, the distributed processing node can, in response to the defined increased amount of time being determined to have elapsed (e.g., by the distributed processing node, allocation component 122, or settlement component 112), reprocess the remaining settlement request. In further embodiments, in response to determining (e.g., by the allocation component 122) remaining settlement requests, the allocation component 122 can replace pending remaining settlement requests of the remaining settlement requests. In this regard, the pending remaining settlement requests can be made available (e.g., using the allocation component 122) for reprocessing by the group of distributed processing nodes 110. In various embodiments, locking of the transaction settlement requests can be facilitated by a distributed processing node using a Locked Until field of the orchestration table 114 (see, e.g., FIG. 3). Once a distributed processing node locks the at least some transaction settlement requests of the group of transaction settlement requests, the distributed processing node is then able to process the transaction settlement requests for the defined amount of time. According to an example, and as discussed above, if distributed a distributed processing node is capable of processing 100 transaction settlement requests at once, the distributed processing node can actually search for 500 transaction settlement requests (e.g., a 5x multiple) from the orchestration table 114, so that the distributed processing node has a sufficient quantity of transaction settlement requests in a buffer of the distributed processing node to keep the distributed processing node busy (e.g., so that the distributed processing node does not become idle after processing the 100 exemplary transaction settlement requests). Additionally, as a distributed processing node processes a defined quantity or percentage of allocated transaction settlement requests, a prefetch operation can be executed by the distributed processing node so that the distributed processing node does fully exhaust transaction settlement requests to process (e.g., during the defined locked period of time). According to an example, the distributed processing node can retrieve additional entries (e.g., transaction settlement requests) from the orchestration table 114, for instance, when the distributed processing node is close to being finished (e.g., 100/500 left). Thus, all 500 transaction settlement requests would receive the "Locked Until."

In further embodiments, the distributed processing node can, in response to a determination that a remaining settlement request of the remaining settlement requests comprises a failed processing request, terminate the remaining settlement request. In this regard, terminating the remaining settlement request can comprise preventing the remaining settlement request from future processing by a distributed processing node of the group of distributed processing nodes 110. The foregoing can prevent additional time from being wasted on a transaction settlement request that is determined to be threshold unlikely to result in future successful processing. Further in this regard, the remaining settlement request would not be made available for reprocessing by the group of distributed processing nodes 110. If, for example, a transaction settlement request is not processed within the defined amount of time, the distributed processing node can return the transaction settlement request to the orchestration table 114. The foregoing can occur, for example, due to a poor connection between the settlement component 112 and another entity (e.g., a bank entity). In this example, the settlement component 112 can try again after waiting for a defined amount of time. In this regard, the Locked Until value can be increased by a defined amount of time.

According to an embodiment, the allocation component 122 can determine that a transaction settlement request of group of transaction settlement requests is not yet ready for processing. In this regard, in response to determining (e.g., by the allocation component 122) that a transaction settlement request is not yet ready for processing, the allocation component 122 can lock the transaction settlement request for a defined period of time. For example, an entity (e.g., a bank or credit entity) can determine that a transaction settlement request is not yet ready for processing (e.g., additional time needed). In this regard, the transaction settlement request can be locked for a determined or defined amount of time (e.g., until the transaction settlement request is ready for processing).

According to an embodiment, the allocation component 122 can allocate to the distributed processing node, a first subgroup of transaction settlement requests of a group of transaction settlement requests (e.g., represented in the orchestration table 114). In this regard, subgroups of the transaction settlement requests can be determined (e.g., using the allocation component 122 and/or distributed processing nodes 110) using a modulo operation applied to unique identifiers for each transaction settlement request of the group of transaction settlement requests. In some implementations, retrieving the at least some transaction settlement requests can comprise retrieving (e.g., via a distributed processing node of the distributed processing nodes 110) settlement requests from among the first subgroup of transaction settlement requests. In this regard, in response to the distributed processing node not retrieving a threshold quantity of transaction settlement requests from the first subgroup of transaction settlement requests the distributed processing node can retrieve settlement requests from among one or more additional subgroups of transaction settlement requests of the group of transaction settlement requests until the threshold quantity of transaction settlement requests is determined to be satisfied. In further implementations, the above distributed processing node can comprise a first processing node, and a second distributed processing node of the distributed processing nodes 110 can retrieve at least some transaction settlement requests of the group of transaction settlement requests other than those successfully processed by the first processing node.

According to an embodiment, machine learning herein can be enabled by the ML component 116 in order to learn to perform various operations associated with other components of the system 102. For example, the ML component 116 can learn to determine respective priorities of types of transaction settlement request herein (e.g., based on successful processing of the request, penalties associated with unsuccessful processing, or other suitable factors). Additionally, the machine learning component 16 can learn to optimally allocate distributed processing nodes 110 herein (e.g., based on feedback data associated with past or current allocations of distributed processing nodes 110 herein). Further, the ML component 116 can learn to determine various thresholds herein, such as Locked For durations of time, defined simultaneous transaction settlement request processing thresholds, processing success/failure thresholds, quantity thresholds herein, or other suitable thresholds. It is noted that the ML component 116 can learn to perform various functions associated with the distributed processing nodes 110, settlement component 112, orchestration table 114, communication component 118, subgroup component 120, allocation component 122, or other suitable components.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or ML components (e.g., ML component 116) herein can comprise artificial intelligence component(s) which can employ an artificial intelligence (AI) model and/or ML or an ML model that can learn to perform the above or below described functions (e.g., via training using historical training data and/or feedback data).

In some embodiments, ML component 116 can comprise an AI and/or ML model that can be trained (e.g., via supervised and/or unsupervised techniques) to perform the above or below-described functions using historical training data comprising various context conditions that correspond to various management operations. In this example, such an AI and/or ML model can further learn (e.g., via supervised and/or unsupervised techniques) to perform the above or below-described functions using training data comprising feedback data, where such feedback data can be collected and/or stored (e.g., in memory) by an ML component 116. In this example, such feedback data can comprise the various instructions described above/below that can be input, for instance, to a system herein, over time in response to observed/stored context-based information.

AI/ML components herein can initiate an operation(s) associated with a based on a defined level of confidence determined using information (e.g., feedback data). For example, based on learning to perform such functions described above using feedback data, performance information, and/or past performance information herein, an ML component 116 herein can initiate an operation associated with decentralized transaction processing. In another example, based on learning to perform such functions described above using feedback data, an ML component 116 herein can initiate an operation associated with updating a model herein.

In an embodiment, the ML component 116 can perform a utility-based analysis that factors cost of initiating the above-described operations versus benefit. In this embodiment, an artificial intelligence component can use one or more additional context conditions to determine an appropriate threshold or context information, or to determine an update for a machine-learning based model.

To facilitate the above-described functions, an ML component herein can perform classifications, correlations, inferences, and/or expressions associated with principles of artificial intelligence. For instance, an ML component 116 can employ an automatic classification system and/or an automatic classification. In one example, the ML component 116 can employ a probabilistic and/or statistical-based analysis (e.g., factoring into the analysis utilities and costs) to learn and/or generate inferences. The ML component 116 can employ any suitable machine-learning based techniques, statistical-based techniques and/or probabilistic-based techniques. For example, the ML component 116 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 116 can perform a set of machine-learning computations. For instance, the ML component 116 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

With reference to FIG. 2, there is illustrated an exemplary system architecture 200 in accordance with one or more embodiments described herein. The system architecture 200 can comprise an orchestration table 202, distributed processing nodes 204, and settlement processing 206 (e.g., comprising settlement processing 212 and settlement processing 218). It is noted that the orchestration table 202 can be similar to the orchestration table 114 and/or orchestration table 300/302 (e.g., as later discussed in greater detail). Further, the distributed processing nodes 204 can be similar to the distributed processing nodes 110. Additionally, settlement processing 212 and/or settlement processing 218 can occur via one or more of a settlement component 112.

According to an example, the processing group 208 can be allocated to a first type of settlement processing and the processing group 214 can be allocated to a second type of settlement processing (it is noted, however, that the use of two processing groups is exemplary and that a variety of quantities of processing groups can be utilized in embodiments herein). In an example, the processing group 208 can be associated with bank settlement processing, and the processing group 214 can be associated with credit settlement processing, though other suitable types of settlement processing can be allocated to one or more groups herein. It is noted that the orchestration table 202 can comprise all of the types of settlement processing requests (e.g., bank, credit, or other suitable types) in the same orchestration table 202. In this regard, the orchestration Flow IDs of the orchestration table 202 can be utilized to differentiate different types of settlement processing requests. Further in this regard, the processing group 208 can comprise distributed processing nodes 210 (e.g., of the distributed processing nodes 204) that are allocated to the processing group 208 (e.g., for bank transaction settlements). Similarly, the processing group 214 can comprise distributed processing nodes 216 (e.g., of the distributed processing nodes 204) that are allocated to the processing group 214 (e.g., for credit transaction settlements). Further, the processing group 208 can comprise one or more settlement processing components that can be associated with settlement processing 212 (e.g., for bank transaction settlements). Likewise, the processing group 214 can comprise one or more settlement processing components that can be associated with settlement processing 218 (e.g., for credit transaction settlements).

In various embodiments, bank transaction settlements herein can comprise one or more of automated clearing house (ACH), original credit transaction (OCT), rapid transactions (e.g., Venmo Instant transfer), or other suitable bank transaction settlements. Similarly, credit transaction settlements herein can comprise one or more of transactions related to credit cards (e.g., credits or refunds to a credit card, rapid or non-rapid credit-related transactions, or other suitable credit-related credit transaction settlements).

It is noted that the settlement processing 212 can retrieve, for example, bank settlement requests via the distributed processing nodes 210, for processing of the bank-type settlement requests of the settlement requests. Likewise, the settlement processing 218 can retrieve, for example, credit settlement requests via the distributed processing nodes 216, for processing of the credit-type settlement requests of the settlement requests. According to an example, the processing group 208 can be associated with a first range of Flow IDs (see, e.g., orchestration table 300), and the processing group 214 can be associated with a second range of Flow IDs. In this regard, the distributed processing nodes 210 can retrieve transaction settlement requests that comprise the first range of Flow IDs, and the distributed processing nodes 216 can retrieve transaction settlement requests that comprise the second range of Flow IDs. It is noted that Flow IDs herein can be associated with one or more respective unique settlement request flows. For example, one flow can comprise crediting funds to a user, from a bank. Another flow can comprise processing rejected transactions (e.g., rejected fund requests from a bank). Another flow can comprise bank clearing. The processing of such flows can occur according to one or more constraints associated with the flow (e.g., time constraints for a fee, volume originating from a particular flow, guarantees against the flow, such as rapid cash-out), or other suitable constraints. It is noted that such flows can be bank-specific (e.g., allocated to an individual bank entity) or bank entities can share a particular flow (e.g., Flow ID herein). A distributed processing node herein (e.g., of the distributed processing nodes 204) can retrieve and process transaction settlement requests from the orchestration table 202 that comprise a corresponding allocated Flow ID representative of a flow allocated to that distributed processing node. In various embodiments, the distributed processing nodes 204 can facilitate the transaction settlement processing herein. In further embodiments, settlement processing components can utilize the distributed processing nodes 204 to assist with the transaction settlement processing herein (e.g., transaction settlement processing using a combination of distributed processing noes and other communicatively coupled components).

FIG. 3 illustrates an exemplary orchestration table 300/302. The orchestration table 300 can comprise a "Task ID" field, "MOD Value" field, "Locked Until" field, "Locked By" field, "Flow ID" field, and/or "Current State" field. It is noted that orchestration table 302 can comprise the orchestration table 300 as subjected to sorting by MOD values (e.g., via a respective task ID subjected to a modulo operation). In this regard, the MOD values can be utilized to divide the orchestration table 300 into virtual sub-tables (e.g., subgroups). In various embodiments, the virtual sub-tables can comprise approximately equal sizes (e.g., of quantities of Task IDs). It is noted that one or more embodiments, no correlation exists between MOD value and Flow ID, and MOD values are utilized in various embodiments for randomly assigning Task IDs to the virtual sub-tables. In an implementation, when a distributed processing node queries the orchestration table 302, the distributed processing node does not query the entire orchestration table 302. Instead, the distributed processing node can query a single virtual sub-table at a time. The foregoing can avoid contention between the distributed processing nodes 110.

After a transaction settlement request has been locked (e.g., by a distributed processing node), and a defined amount of time has elapsed since the locking, generally one of three outcomes occurs (of the processing of the transaction settlement request): (1) success; (2) failure; or (3) pending/transient failure. In this regard, a success can be indicative of the transaction settlement request being successfully processed. Failure can be indicative of the transaction settlement request having failed (e.g., and should not be reprocessed or redelivered). Pending/transient failure (e.g., journaled) can be indicative of a transaction settlement request that has failed, but should be redelivered (e.g., reattempted) within a defined period of time. Said outcome can be logged in the Current State column of the orchestration table 302. In this regard, for a journaled entry, the Locked Until time can be extended for a defined extended amount of time so that the transaction settlement request can be reattempted.

The Locked By fields can be populated (e.g., by a distributed processing node) with a universally unique identifier (UUID). The UUID can be generated each time the distributed processing node accesses the orchestration table 302. When a distributed processing node locks a Task ID (e.g., a transaction settlement request), the distributed processing node can apply the UUID associated with the lock by the distributed processing node. It is noted that in various embodiments, the UUID is not unique to the distributed processing node itself, and is instead indicative of the specific instance of the distributed processing node applying the specific lock. In other embodiments, however, the UUID can be associated with the distributed processing node that applied the lock. The distributed processing node can apply the UUID to lock the Task ID, and the distributed processing nodes 110 can be required to present the UUID in order to retrieve the Task ID again. In this regard, a subsequent distributed processing node can be prevented from attempting to process the transaction settlement request while an initial distributed processing node is actively processing the transaction settlement request or has locked the transaction settlement request for future processing.

Figure 4:
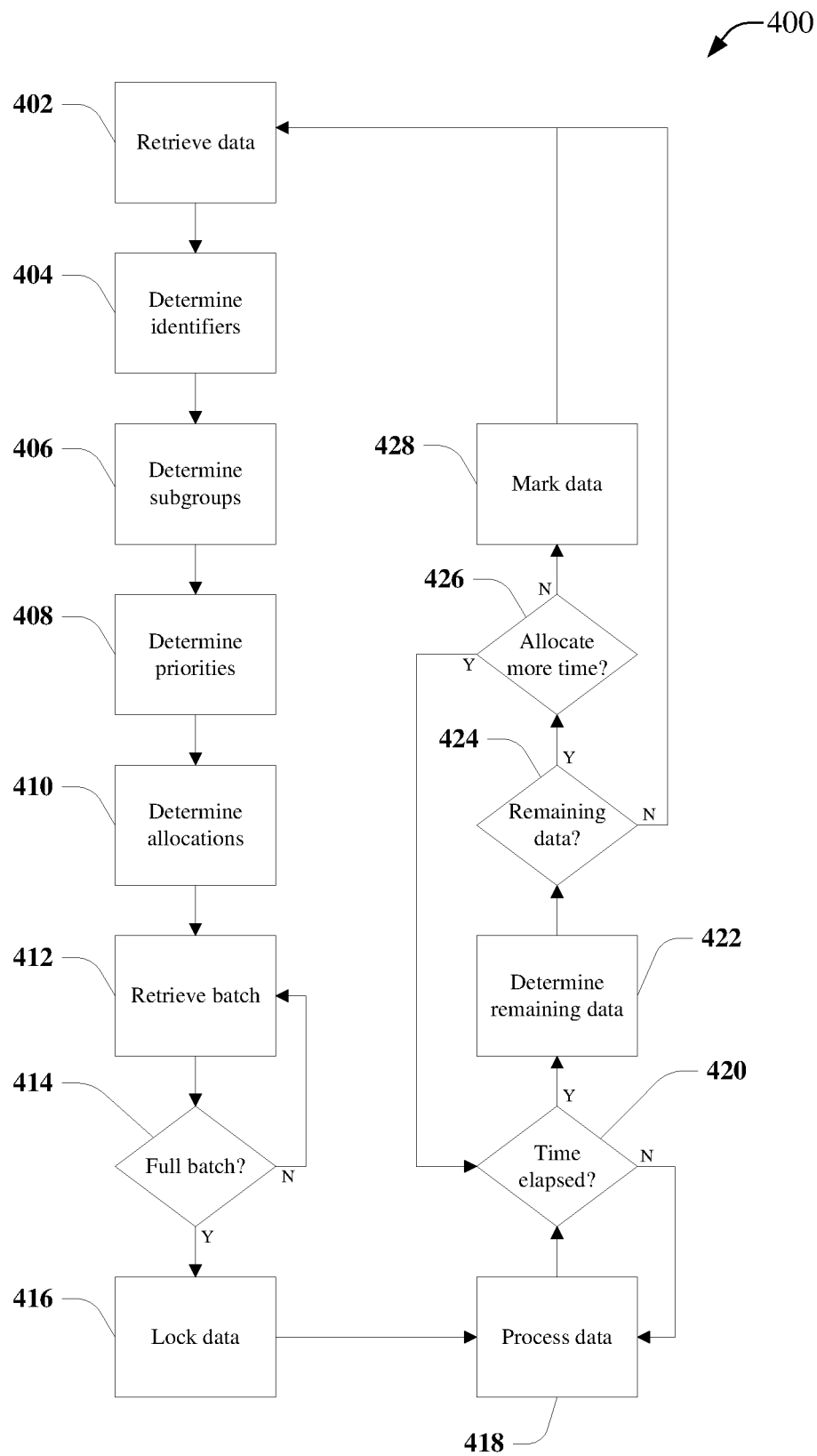
FIG. 4 is a flowchart of exemplary decentralized settlement processing in accordance with one or more embodiments described herein.

Turning now to FIG. 4, there is illustrated a flowchart of a process 400 for decentralized transaction processing in accordance with one or more embodiments herein. At 402, data (e.g., transaction settlement data) can be received or accessed (e.g., via a communication component 118) and stored in an orchestration table (e.g., orchestration table 114, orchestration table 202, or orchestration table 300/302). It is noted that the orchestration table can comprise a group of transaction settlement requests. Transaction settlement request herein can be received, for instance, from bank entities, credit entities, consumer/user entities, associated devices/hardware, or other suitable entities. At 404, identifiers (e.g., Task IDs) can be determined (e.g., via the communication component 118) for the entries in the orchestration table. Task IDs herein can be representative of unique transaction settlement requests in the orchestration table. At 406, subgroups in the orchestration table can be determined (e.g., using the subgroup component 120). It is noted that the subgroup component 120 can determine the subgroups of the transaction settlement requests using a MOD operation applied to unique identifiers (e.g., Task ID) for each transaction settlement request of the group of transaction settlement requests. Such a MOD operation can partition the group of transaction settlement requests (e.g., the orchestration table 114) into subgroups (e.g., virtual sub-tables of the orchestration table 114). For example, a MOD operation can be applied to a Task ID herein to generate a defined quantity of virtual sub-tables from the orchestration table 114.

At 408, the allocation component 122 can determine respective priorities of the settlement requests. For example, a rapid-type transaction can be allocated a larger quantity of distributed processing nodes 110 than a non-rapid-type transaction. In various embodiments, a respective priority of the respective priorities can be based on a respective defined guaranteed processing time of a type of transaction settlement request. In some implementations embodiments, a respective priority of an original credit transaction type transaction (e.g., a rapid-type transaction) can be greater than a respective priority of an automated clearing house type transaction (e.g., a non-rapid-type transaction). In further implementations, the respective priorities of each transaction settlement request can be based in part on a processing fee associated with each transaction settlement request. In this regard, settlement request for which a user or entity paid a fee to process (e.g., for expedited processing) can be determined to be of a higher relative priority and/or can be allocated additional distributed processing nodes 110. In various embodiments, capacity allocation herein can comprise the quantity of distributed processing nodes associated with a particular Flow ID. In some implementations, capacity allocation herein can be associated with the quantity of concurrent transactions settlements to process for a particular Flow ID.

At 410, the allocation component can determine distributed processing allocation data representative of an allocation of threads of distributed processing nodes of a group of distributed processing nodes (e.g., distributed processing nodes 110). In this regard, the distributed processing node (e.g., via one or more threads of the distributed processing node) can process transaction settlement requests comprising a defined priority identifier associated with the distributed processing node. It is noted that a given distributed processing node, or a thread of a distributed processing node, can be associated with one or more defined priority identifiers (e.g., Flow IDs). In further embodiments, the distributed processing node can comprise a defined simultaneous transaction settlement request processing threshold. In various implementations, the defined simultaneous transaction settlement request processing threshold can be based on, for instance, a capability of the distributed processing node (e.g., compute capability, available memory, or set according to a specification). In this regard, the thread or the distributed processing node can process batches of transaction settlement requests determined based on a defined multiple of the defined simultaneous transaction settlement request processing threshold. It is noted that the allocation component 122 can allocate a defined multiple of distributed processing node capacity to a given distributed processing node at a time.

At 412, a distributed processing node (e.g., of a group of distributed processing nodes 110) can retrieve a batch of transaction settlement requests from the orchestration table (e.g., based on the respective priorities and/or the allocation data). In various embodiments, the batch of transaction settlement requests can comprise a defined multiple of a defined simultaneous transaction settlement request processing threshold of a distributed processing node herein. At 414, if the batch retrieval results in the distributed processing node retrieving a threshold quantity of transaction settlement requests, the process 400 can proceed to 416. For example, the threshold quantity of transaction settlement requests can comprise a simultaneous settlement processing capability of the distributed processing node (e.g., compute capability, available memory, or set according to a specification). If at 414, the batch retrieval does not result in the distributed processing node retrieving the threshold quantity of transaction settlement requests, the process can return to 412, at which another batch retrieval can occur (e.g., until the threshold quantity is reached or until the available transaction settlement requests are exhausted).

At 416, the transaction settlement requests (e.g., as retrieved by the distributed processing node) can be locked for a defined period of time. During this defined period of time, the transaction settlement requests can be processed (e.g., via the distributed processing node and/or communicatively coupled transaction settlement services) at 418. The foregoing can continue at 420 until the defined period of time has elapsed. At 422, remaining data (e.g., remaining transaction settlement requests, if any) can be determined (e.g., by the allocation component 122). At 424, if any transaction settlement requests remain (e.g., from among the transaction settlement requests locked for the defined period of time by the distributed processing node), the process 400 can comprise allocate more time at 426 if more time is to be allocated. If more time is not to be allocated, the process 400 can comprise marking the data at 428. In this regard, if more time is not to be allocated at 428, the locks can expire, and a future node can thus retrieve the remaining settlement requests from the orchestration table and process one or more of said remaining settlement requests.

Figure 5:
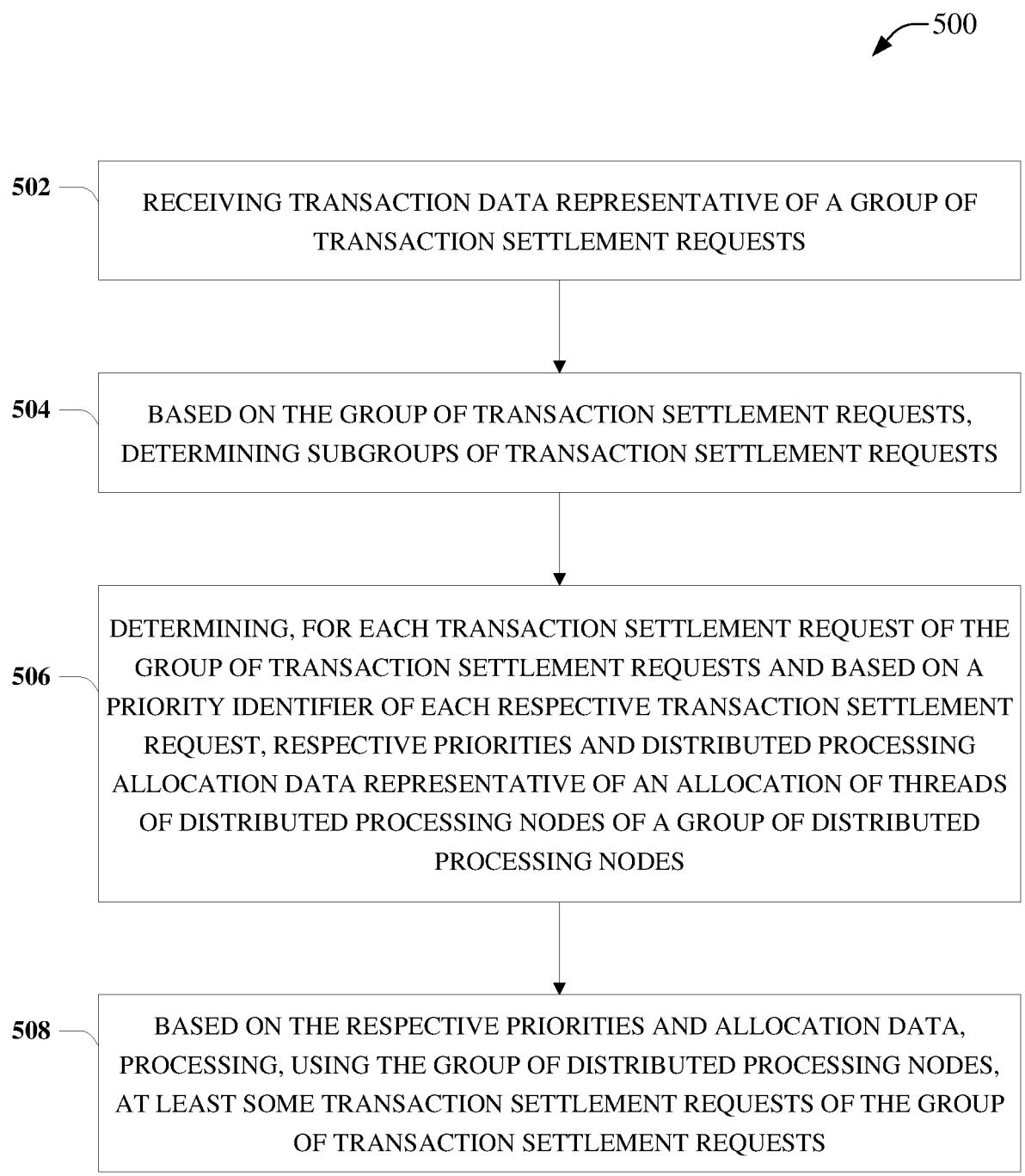
FIG. 5 is a block flow diagram for a process for decentralized settlement processing in accordance with one or more embodiments described herein.

FIG. 5 illustrates a block flow diagram for a process 500 for decentralized transaction processing in accordance with one or more embodiments described herein. At 502, the process 500 can comprise receiving (e.g., using the communication component 118) transaction data representative of a group of transaction settlement requests. At 504, the process 500 can comprise, based on the group of transaction settlement requests, determining (e.g., using the subgroup component 120) subgroups of transaction settlement requests. At 506, the process 500 can comprise determining (e.g., using the allocation component 122), for each transaction settlement request of the group of transaction settlement requests and based on a priority identifier of each respective transaction settlement request, respective priorities and distributed processing allocation data representative of an allocation of threads of distributed processing nodes of a group of distributed processing nodes (e.g., distributed processing nodes 110). At 508, the process 500 can comprise, based on the respective priorities and allocation data, processing, using the group of distributed processing nodes, at least some transaction settlement requests of the group of transaction settlement requests.

Figure 6:
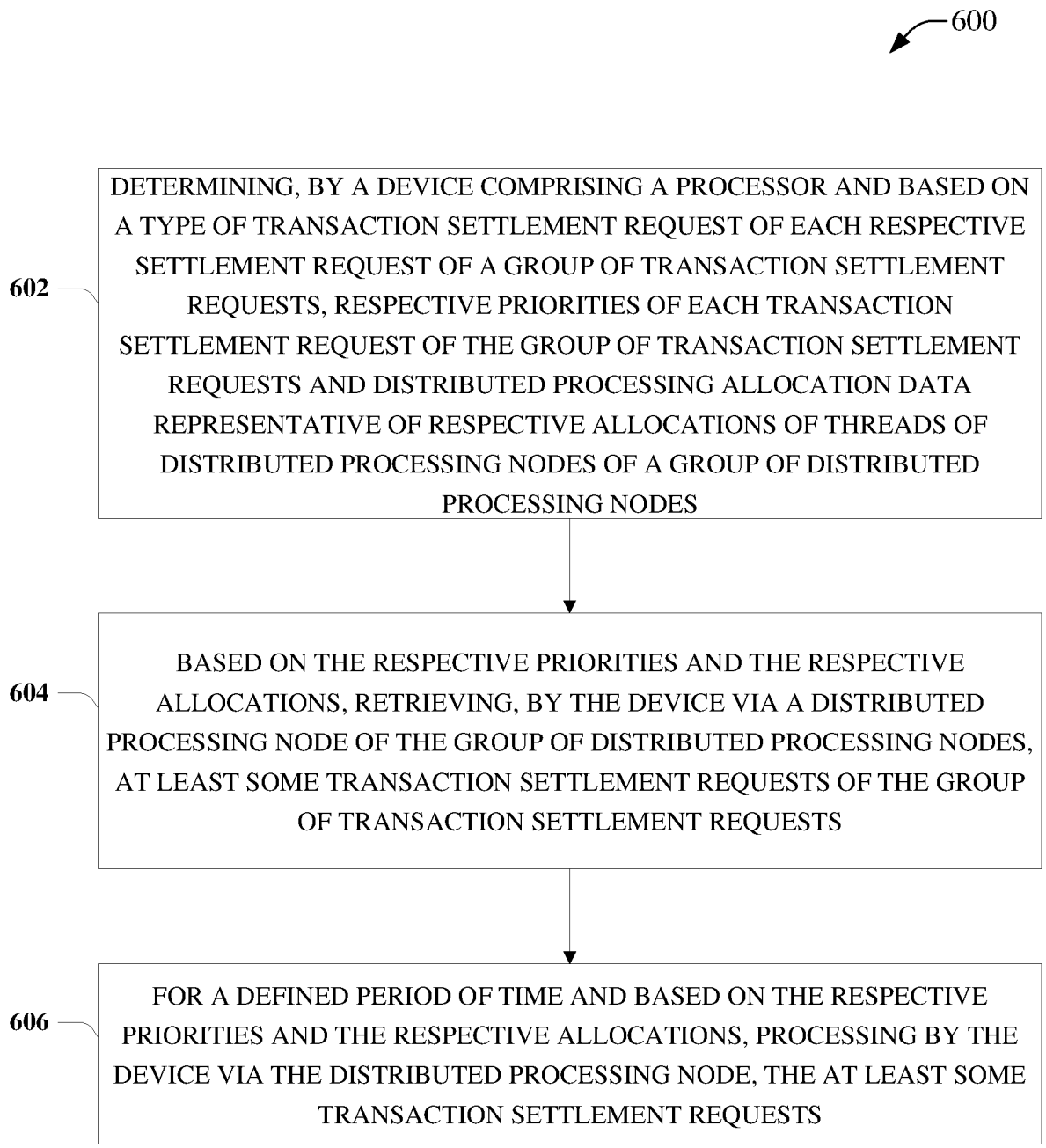
FIG. 6 is a block flow diagram for a process for decentralized settlement processing in accordance with one or more embodiments described herein.

FIG. 6 illustrates a block flow diagram for a process 600 for decentralized transaction processing in accordance with one or more embodiments described herein. At 602, the process 600 can comprise determining (e.g., using an allocation component 122), by a device comprising a processor and based on a type of transaction settlement request of each respective settlement request of a group of transaction settlement requests, respective priorities of each transaction settlement request of the group of transaction settlement requests and distributed processing allocation data representative of respective allocations of threads of distributed processing nodes of a group of distributed processing nodes. At 604, the process 600 can comprise, based on the respective priorities and the respective allocations, retrieving, by the device via a distributed processing node of the group of distributed processing nodes (e.g., distributed processing nodes 110), at least some transaction settlement requests of the group of transaction settlement requests. At 606, the process 600 can comprise, for a defined period of time and based on the respective priorities and the respective allocations, processing by the device via the distributed processing node, the at least some transaction settlement requests.

Figure 7:
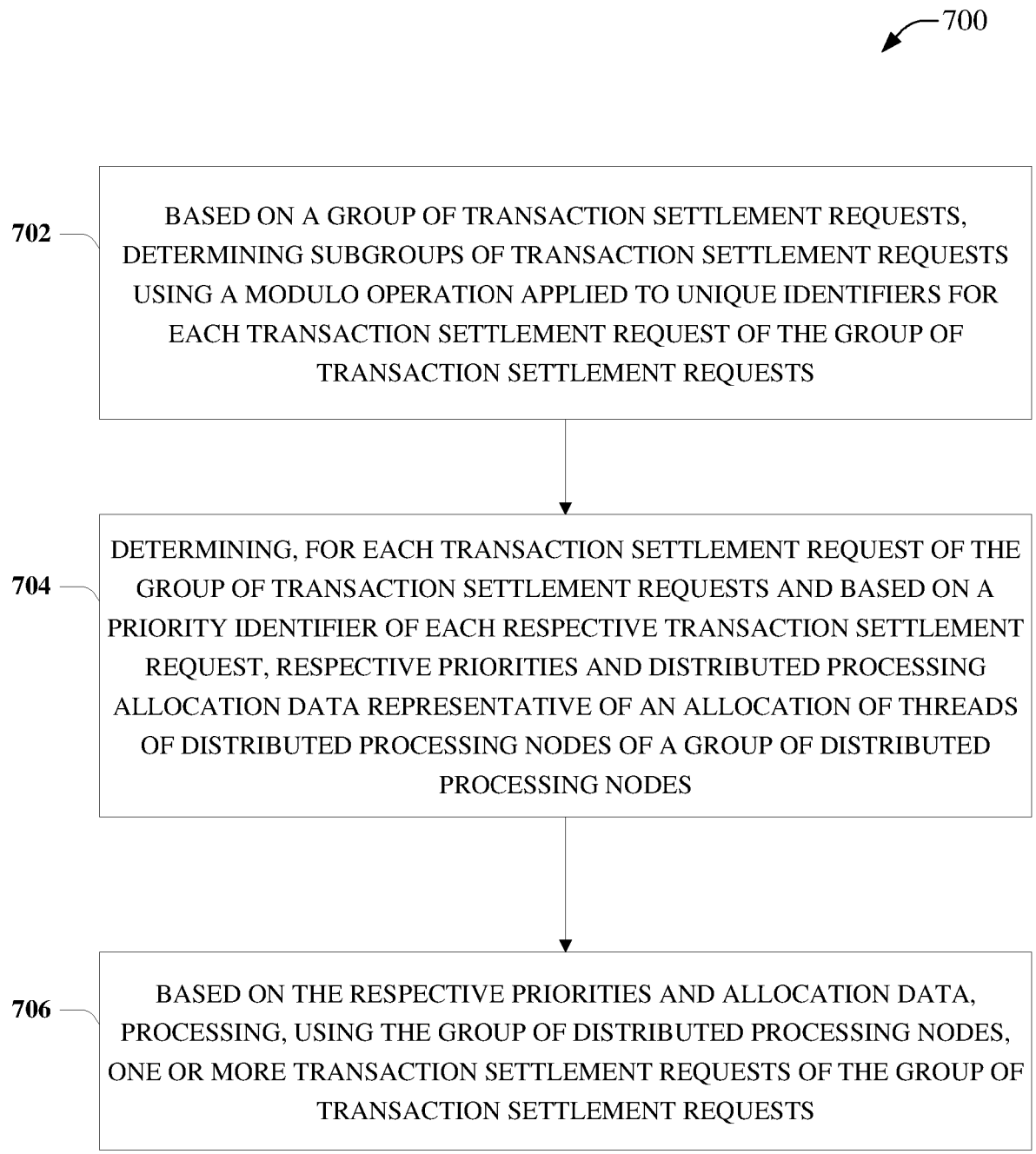
FIG. 7 is a block flow diagram for a process for decentralized settlement processing in accordance with one or more embodiments described herein.

FIG. 7 illustrates a block flow diagram for a process 700 for decentralized transaction processing in accordance with one or more embodiments described herein. At 702, the process 700 can comprise, based on a group of transaction settlement requests, determining (e.g., using the subgroup component 120) subgroups of transaction settlement requests using a modulo operation applied to unique identifiers for each transaction settlement request of the group of transaction settlement requests. At 704, the process 700 can comprise determining (e.g., using the allocation component 122), for each transaction settlement request of the group of transaction settlement requests and based on a priority identifier of each respective transaction settlement request, respective priorities and distributed processing allocation data representative of an allocation of threads of distributed processing nodes of a group of distributed processing nodes (e.g., distributed processing nodes 110). At 706, the process 700 can comprise, based on the respective priorities and allocation data, processing, using the group of distributed processing nodes, one or more transaction settlement requests of the group of transaction settlement requests.

Figure 8:
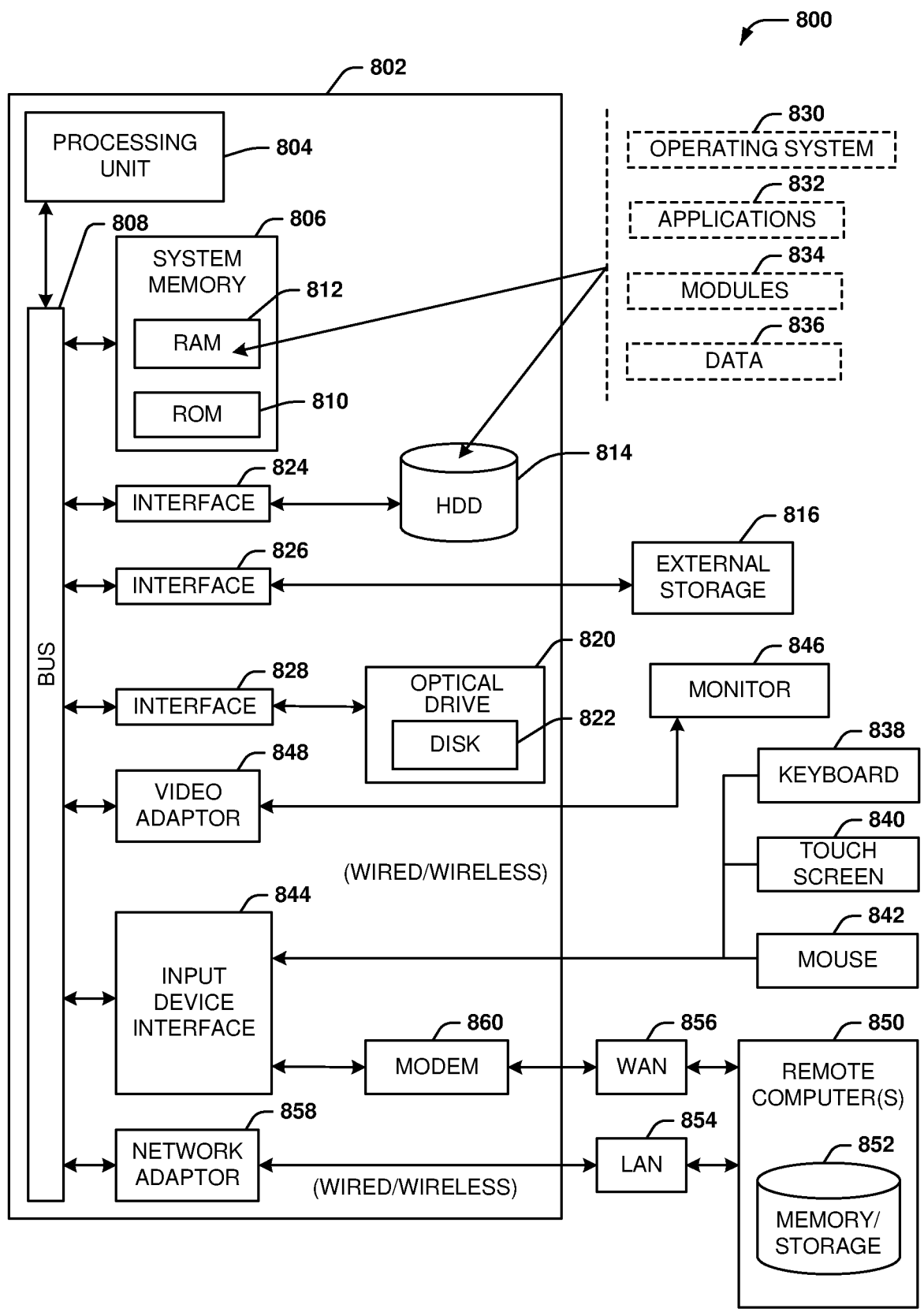
FIG. 8 is an example, non-limiting computing environment in which one or more embodiments described herein can be implemented.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid-state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
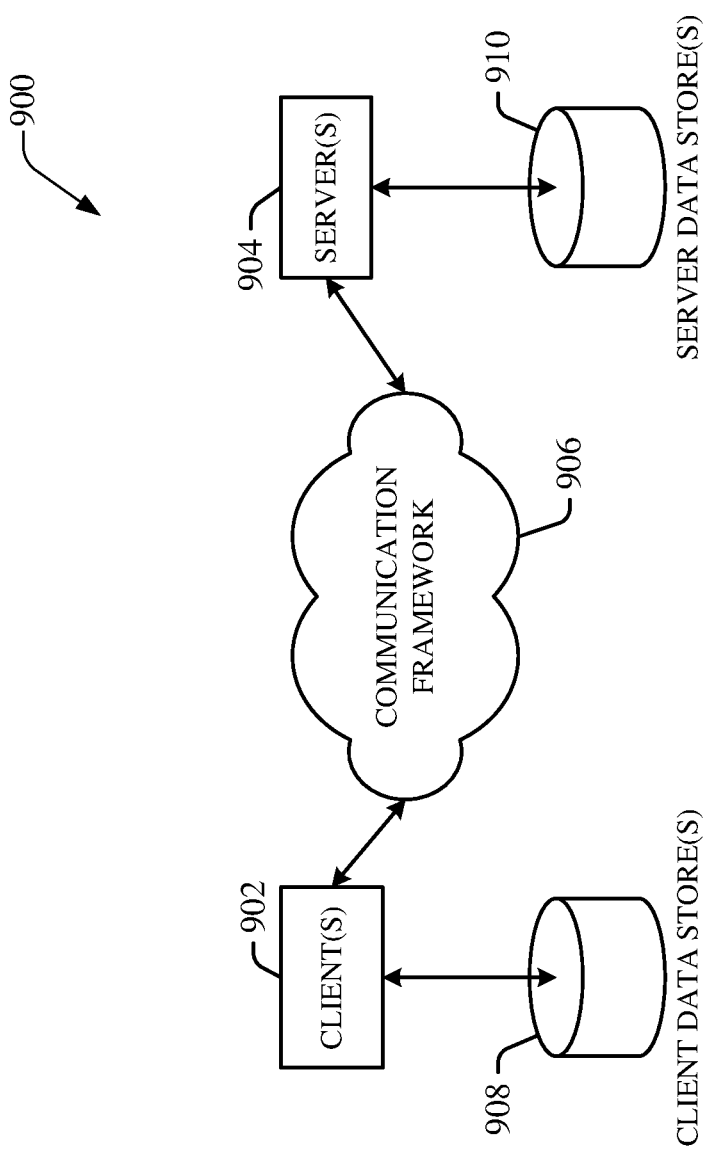
FIG. 9 is an example, non-limiting networking environment in which one or more embodiments described herein can be implemented.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform transformations of media items by employing aspects of this disclosure, for example. One possible communication between a client 902 and a server 904 can be in the form of a data packet adapted to be transmitted between two or more computer processes wherein data packets may include coded analyzed headspaces and/or input. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one exemplary implementation, a client 902 can transfer an encoded file, (e.g., encoded media item), to server 904. Server 904 can store the file, decode the file, or transmit the file to another client 902. It is noted that a client 902 can also transfer uncompressed file to a server 904 and server 904 can compress the file and/or transform the file in accordance with this disclosure. Likewise, server 904 can encode information and transmit the information via communication framework 906 to one or more clients 902.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
receiving transaction data representative of a plurality of transaction settlement requests;
determining an identifier for a transaction settlement request of the plurality of transaction settlement requests, wherein the identifier is determined based on applying an operation to a unique identifier associated with the transaction settlement request;
allocating the transaction settlement request to a subgroup of transaction settlement requests of the plurality of transaction settlement requests, wherein the allocation of the transaction settlement request to the subgroup of transaction settlement requests is based on the determined identifier;
determining, for the transaction settlement request, a priority and a distributed processing allocation data for the transaction settlement request based on the identifier associated with the transaction settlement request;
allocating a thread of a distributed processing node of a plurality of distributed processing nodes to the transaction settlement request based on the priority and the distributed processing allocation data;
processing, using the thread of the distributed processing node, the transaction settlement request of the subgroup of transaction settlement requests, wherein an order for processing the transaction settlement request of the subgroup of transaction settlement requests is based on the determined priority and the distributed processing allocation data, and wherein processing the transaction settlement request comprises:
- locking, by the thread of the distributed processing node, a batch of transaction settlement requests including the transaction settlement request of the subgroup of transaction settlement requests for a defined period of time, wherein the locking prevents other distributed processing nodes of the plurality of distributed processing nodes from interrupting the processing; and
- processing, in response to retrieving a threshold quantity of transaction settlement requests, the locked batch of transaction settlement requests including the transaction settlement request by the thread of the distributed processing node for the defined period of time; and
- processing, using the thread of the distributed processing node, one or more remaining transaction settlement requests in response to determining the defined period of time has elapsed based on a respective priority and a respective distributed processing allocation data associated with each of the one or more remaining transaction settlement requests.

2. The system of claim 1, wherein the operation comprises a modulo operation applied to the unique identifier associated with the transaction settlement request.

3. The system of claim 1, wherein the thread of the distributed processing node processes the transaction settlement request in the subgroup of transaction settlement requests based on a defined priority identifier associated with the distributed processing node.

4. The system of claim 1, wherein the distributed processing node comprises a defined simultaneous transaction settlement request processing threshold, and wherein the distributed processing node processes batches of transaction settlement requests determined based on a defined multiple of the defined simultaneous transaction settlement request processing threshold.

5. The system of claim 1, wherein the operations further comprise:
- in response to a determination that a remaining transaction settlement request of the one or more remaining transaction settlement requests comprises a pending processing request, increasing the defined period of time by a defined increased amount of time; and
- in response to the defined increased amount of time being determined to have elapsed, reprocessing, the remaining transaction settlement request via the distributed processing node.

6. The system of claim 1, wherein the operations further comprise:
- in response to a determination that a remaining transaction settlement request of the one or more remaining transaction settlement requests comprises a failed processing request, terminating the remaining transaction settlement request, wherein terminating the remaining transaction settlement request comprises preventing the remaining transaction settlement request from future processing by the plurality of distributed processing nodes.

7. The system of claim 1, wherein the priority of the transaction settlement request is based on a defined guaranteed processing time of a type of the transaction settlement request.

8. The system of claim 1, wherein a priority of an original credit transaction type transaction is greater than a priority of an automated clearing house type transaction.

9. The system of claim 1, wherein the operations further comprise:
- determining that the transaction settlement request is not yet ready for processing; and
- in response to determining that the transaction settlement request is not yet ready for processing, locking the transaction settlement request for the defined period of time.

10. The system of claim 1, wherein locking the transaction settlement request for the defined period of time further comprises:
- determining, by the thread of the distributed processing node, a lock identifier indicative of a locking instance for the transaction settlement request;
- associating, by the thread of the distributed processing node, the lock identifier with the transaction settlement request;
- obtaining, by the thread of the distributed processing node, the unique identifier for the transaction settlement request from the transaction data based on the lock identifier; and
- updating, by the thread of the distributed processing node following the defined period of time, the transaction data based on the processing,
- wherein the other distributed processing nodes are prevented from processing the locked transaction settlement request without the lock identifier.

11. The system of claim 1, wherein the operations further comprise:
- determining a simultaneous processing threshold based on characteristics of the thread of the distributed processing node;
- determining a multiple of the simultaneous processing threshold for the thread of the distributed processing node;
- retrieving, by the thread of the distributed processing node, the batch of transaction settlement requests for processing including the transaction settlement request from the subgroup of transaction settlement requests based on the multiple of the simultaneous processing threshold; and
- retrieving, by the thread of the distributed processing node, the one or more remaining transaction settlement requests in response to determining the defined period of time has elapsed.

12. A method, comprising:
- determining, by a device comprising a processor, an identifier for a transaction settlement request of a plurality of transaction settlement requests based on applying a modulo operation to a unique identifier associated with the transaction settlement request;
- allocating the transaction settlement request to a subgroup of transaction settlement requests of the plurality of transaction settlement requests, wherein the allocation of the transaction settlement request to the subgroup of transaction settlement requests is based on the determined identifier;
- determining, for the transaction settlement request, a priority and a distributed processing allocation data for the transaction settlement request based on the identifier associated with the transaction settlement request;
- allocating a thread of a distributed processing node of a plurality of distributed processing nodes to the transaction settlement request based on the priority and the distributed processing allocation data for the transaction settlement request;

based on the priority and the allocation, retrieving, by the device via the thread of the distributed processing node, the transaction settlement request of the plurality of transaction settlement requests;

processing, by the device using the thread of the distributed processing node, the transaction settlement request of the subgroup of transaction settlement requests, wherein an order for processing the transaction settlement request of the subgroup of transaction settlement requests is based on the determined priority and the distributed processing allocation data, and wherein processing the transaction settlement request comprises:

locking, by the thread of the distributed processing node, a batch of the transaction settlement requests including the transaction settlement request of the subgroup of transaction settlement requests for a defined period of time, wherein the locking prevents other distributed processing nodes of the plurality of distributed processing nodes from interrupting the processing; and processing, in response to retrieving a threshold quantity of transaction settlement requests, the locked batch of transaction settlement requests including the transaction settlement request by the thread of the distributed processing node for the defined period of time; and processing, by the device using the thread of the distributed processing node, one or more remaining transaction settlement requests in response to determining the defined period of time has elapsed based on a respective priority and a respective distributed processing allocation data associated with each of the one or more remaining transaction settlement requests.

13. The method of claim 12, further comprising:

determining, by the device via the distributed processing node, a lock identifier indicative of a locking instance for the transaction settlement request;

associating, by the device via the distributed processing node, the lock identifier with the transaction settlement request of the plurality of transaction settlement requests; and in response to the defined period of time being determined to have elapsed, determining, by the device, one or more remaining settlement requests in the subgroup of transaction settlement requests, wherein the other distributed processing nodes of the plurality of distributed processing nodes are prevented from processing the locked transaction settlement request without the lock identifier.

14. The method of claim 13, further comprising:

replacing, by the device, pending remaining settlement requests of the one or more remaining settlement requests, wherein the pending remaining settlement requests are made available, by the device, for reprocessing by the plurality of distributed processing nodes.

15. The method of claim 13, further comprising:

terminating, by the device, failed remaining settlement requests of the one or more remaining settlement requests, wherein the failed remaining settlement requests are not made available, by the device, for reprocessing by the plurality of distributed processing nodes.

16. The method of claim 12, further comprising:

allocating, by the device to the thread of the distributed processing node, the subgroup of transaction settlement requests of the plurality of transaction settlement requests, wherein a plurality of subgroups of transaction settlement requests are determined, by the device, using the modulo operation applied to the unique identifier for each respective transaction settlement request of the plurality of transaction settlement requests.

17. The method of claim 16, wherein retrieving the transaction settlement request comprises retrieving, by the device via the distributed processing node, the transaction settlement request from the subgroup of transaction settlement requests; and in response to the distributed processing node not retrieving a threshold quantity of transaction settlement requests from the subgroup of transaction settlement requests, retrieving, by the device via the distributed processing node, one or more other transaction settlement requests from among one or more additional subgroups of transaction settlement requests of the plurality of transaction settlement requests until the threshold quantity of transaction settlement requests is determined to be satisfied.

18. The method of claim 12, wherein the distributed processing node comprises a first distributed processing node, and wherein the method further comprises:

retrieving, by the device via a second distributed processing node of the plurality of distributed processing nodes, at least some transaction settlement requests of the plurality of transaction settlement requests other than those successfully processed by the first distributed processing node.

19. A non-transitory machine-readable medium, comprising executable instructions that, when executed by a processor, facilitate performance of operations, comprising:

determining an identifier for a transaction settlement request of a plurality of transaction settlement requests, wherein the identifier is based on applying a modulo operation to a unique identifier associated with the transaction settlement request;

allocating the transaction settlement request to a subgroup of transaction settlement requests of the plurality of transaction settlement requests, wherein the allocation of the transaction settlement request to the subgroup of transaction settlement requests is based on the determined identifier;

determining, for the transaction settlement request, a priority and a distributed processing allocation data for the transaction settlement request based on the identifier associated with the transaction settlement request;

allocating a thread of a distributed processing node of a plurality of distributed processing nodes to the transaction settlement request based on the priority and the determined distributed processing allocation data;

processing, using the thread of the distributed processing node, the transaction settlement request of the subgroup of transaction settlement requests, wherein an order for processing the transaction settlement request is based on the determined priority and the distributed processing allocation data, and wherein processing the transaction settlement request comprises:

locking, by the thread of the distributed processing node, a batch of transaction settlement requests including the transaction settlement request of the subgroup of transaction settlement requests for a defined period of time, wherein the locking prevents other distributed processing nodes of the plurality of distributed processing nodes from interrupting the processing; and processing, in response to retrieving a threshold quantity of transaction settlement requests, the locked batch of transaction settlement request including the transaction settlement request by the thread of the distributed processing node for the defined period of time; and processing, using the thread of the distributed processing node, one or more remaining transaction settlement requests in response to determining the defined period of time has elapsed based on a respective priority and a respective distributed processing allocation data associated with each of the one or more remaining transaction requests, wherein the locking enables the thread of the distributed processing node to process the transaction settlement request without interruption from other distributed processing nodes of the plurality of distributed processing nodes.

20. The non-transitory machine-readable medium of claim 19, wherein the respective priority of each of the one or more remaining transaction settlement requests are based in part on a processing fee associated with each of the one or more remaining transaction settlement requests.

* * * * *